March 10, 1964 K. E. DYE ETAL 3,123,856
FOAMED PROCESS AND APPARATUS
Filed May 31, 1961
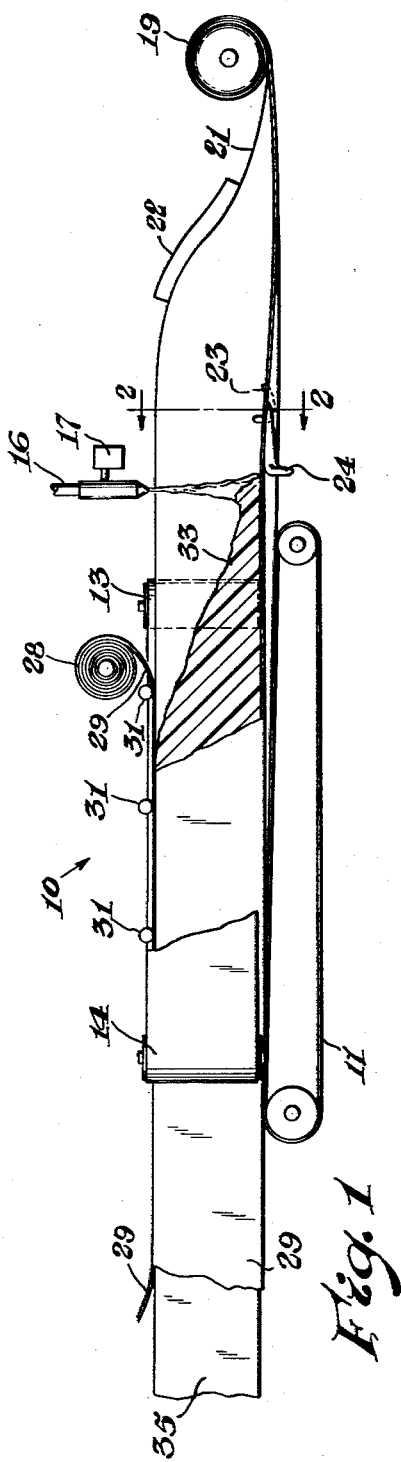
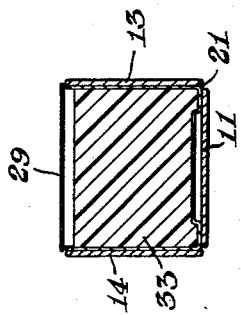
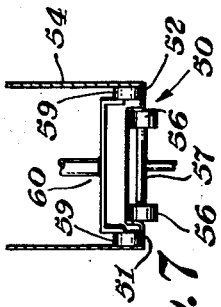
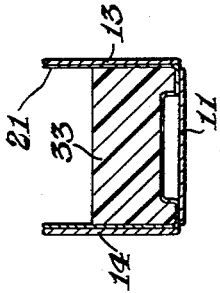
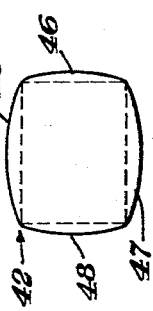
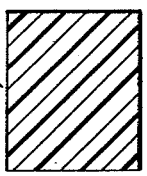
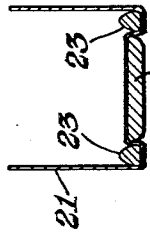
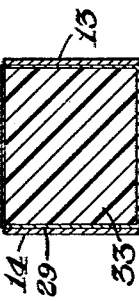
INVENTORS.
Kenneth E. Dye
Wilbur L. Bressler
Kenneth M. Tolleson
BY
AGENT «United States Patent Office»

3,123,856
Patented Mar. 10, 1964

3,123,856
FOAMED PROCESS AND APPARATUS
Kenneth E. Dye, Wilbur L. Bressler, and Kenneth M. Tolleson, all of Lake Jackson, Tex., assignors to The Dow Chemical Company, Midland, Mich., a corporation of Delaware
Filed May 31, 1961, Ser. No. 113,888
8 Claims. (Cl. 18—4)

This invention relates to a method and apparatus for the production of foamed plastic products, and more particularly, relates to an improved apparatus and method for the processing of a foamable plastic liquid mixture into a foam plastic rigid slab of regular cross-section.

The known method for the production of foamed plastics from foamable liquid mixtures, such as polyurethane foam slabs, comprises extruding a foamable mixture, such as a foaming polyurethane composition into a trough of generally rectangular cross-section formed by a paper web or similar continuous membrane.

The paper trough is usually supported in continuous operation by means of a plurality of conveyer belts so constructed and arranged so as to provide support for the bottom and two sides of the paper trough. Frequently, a top for the trough is provided which comprises a sheet of paper or similar material which is continuously supplied at a rate equal to the supply rate of the paper trough. Beneficially, the top of the trough is provided with a resiliently loaded backing plate to provide a relatively rigid rectangular paper lined passage.

The polyurethane or similar foamable composition, which is supplied in a quantity sufficient to substantially fill the trough when foamed, reacts and expands, finally solidifying into a paper coated slab or plank. Although the paper trough and conveyor belts supporting the trough have a rigid rectangular configuration, the cross section of the final product does not conform to that of the trough. A billet or slab having rounded corners and generally outwardly bulging arcuate sides is prepared by the method.

Although such an apparatus is capable of producing a relatively large slab of foamed plastic material, the lack of rectangular cross section is commercially undesirable. Therefore, in order to obtain a product which is commercially acceptable, the slab must be trimmed to a generally rectangular configuration. Such an operation generally involves "squaring" in a manner similar to that employed in the lumber industry. This results in considerable waste as much as 30 percent and even more, which is similar to the slab waste of the lumber industry when logs are sawed into lumber.

It is an object of this invention to provide a method and apparatus for the production of a foam plastic slab having a generally rectangular cross-sectional configuration.

It is yet another object of this invention to provide an apparatus for the production of polyurethane foam slab having a rectangular cross sectional configuration.

It is still a further object of this invention to provide an improved method and apparatus employing a shaped paper trough for polyurethane foam slab production.

These benefits and other advantages are attained in the production of foam slab comprising a flexible web trough having two upwardly expanding sides and a bottom, the sides and bottom of which are supported by individual conveyor belts synchronized to forward the web; and a source of supply of foamable plastic material, the improvement which comprises: forming at the bottom of said web a pair of folds generally adjacent to the upwardly extending portions of the web, adding a quantity of foam plastic producing material to said trough permitting said liquid to expand and open said folds and set to a rigid foam slab having a cross sectional configuration corresponding to that of said trough.

The apparatus of the invention comprises a machine for the production of foam slab comprising a generally rectangular trough formed from a thin web, said trough having two generally vertically extending sides, said web being supported by at least three conveyor belts, means for supplying a foamable synthetic resinous composition, the improvement of which comprises the addition of means to provide a pair of folds in the bottom of the web trough adjacent to the vertically extending sides.

These benefits and other advantages will become more apparent when taken in consideration with the following specification and drawing wherein:

FIGURE 1 is a longitudinal schematic partially-in-section view of an apparatus in accordance with the invention.

FIGURE 2 is a schematic representation of a section of the apparatus of FIGURE 1 wherein the folds are formed in the web trough.

FIGURE 3 is a section of the apparatus of FIGURE 1 after the addition of the foamable composition.

FIGURE 4 is a section of the trough of FIGURE 1 wherein the trough is almost filled with foam plastic.

FIGURE 5 is a section of the apparatus of FIGURE 1, wherein the trough has been completely filled with foam plastic.

FIGURES 6 and 6a depict cross sections of a slab formed in accordance with the invention and a slab formed in accordance with prior art; and FIGURE 7 shows a schematic arrangement of alternate equipment for forming folds in the trough.

The apparatus of the invention is illustrated in FIGURE 1 and is generally designated by the reference numeral 10. The apparatus 10 comprises a lower conveyor 11, a side conveyor 13 and a second side conveyor 14. A foamable liquid plastic supply nozzle 16 is disposed toward one end of the conveyors and is supported by a traverse mechanism 17. A supply roll 19 contains, wound thereon, a thin flexible web 21 which extends toward the conveyors 11, 13 and 14, and passes over a trough forming means 22 (one shown). Immediately after the forming means 22, the generally trough-like web engages a pair of lower fold forming means 23 (one shown) and an upwardly disposed fold forming means 24. A supply roll 28 is positioned forward of the nozzle 16 which carries a web 29. The web 29 is maintained in position by idler rolls 31. Within the web 21 is disposed a foamable plastic composition 33 and issuing from the machine is a rigid foam slab 35.

FIGURE 2 is a section through the web 21 at the location of the forming shoes illustrating the coaction of the fold forming means 23 in displacing the web 21 on either side of the fold forming means 24.

The configuration of the web 21 in relation to the conveyor belts 13 and 14 is illustrated in FIGURE 3. The foamable material 33 partially fills the space enclosed by the web 21.

FIGURE 4 is a cross section of the apparatus 10 wherein the foaming material 33 has almost filled the channel provided by the web 21 and the web 29 is positioned in the upper opening of the channel.

FIGURE 5 illustrates the completed foaming within the webs 21 and 29 where the folds have been completely eliminated by the swelling and expansion of the foaming mass 33, resulting in a slab having a substantially rectangular cross section.

FIGURE 6 represents the generally rectangular cross section 40 of a slab obtained from practice of the invention whereas, for purposes of comparison in FIGURE 6a, there is illustrated a general cross sectional configuration 42 of a slab obtained by the practice of the prior art. Within the outline of FIGURE 6a, dotted lines are inserted illustrating the commercially acceptable cross section 44 of slab which may be obtained when the waste material 45, 46, 47 and 48 has been removed.

In FIGURE 7, there is schematically shown an end view of an alternate embodiment of means generally designated by the reference numeral 50 for forming folds 51 and 52 in a web trough 54. A pair of lower, narrow tracking rollers 56, corresponding in function to shoe 24 of FIGURE 2, in engagement with the bottom of trough 54, are rotatably supported by support means 57. A wider tracking pair of rollers 59 are rotatably mounted on support means 60, within and in engagement with the bottom of the trough 54. All rollers 56 and 59 rotate in generally vertical planes substantially parallel to the direction of movement of the trough 54. The lower peripheral portions of the roller 59 are positioned lower than the upper peripheral of the lower rollers 56. Passage of the bottom of the trough 54 between this roller configuration forms the folds 51 and 52.

In operation of the invention it is usually advantageous to employ a paper web of 60 pounds or even heavier grades in most commercial machines. The heavier paper web is required to prevent sag and deformation which causes corresponding deformities in the foam produced. However, lighter webs may be employed if sufficient additional support is provided.

The invention is illustrated employing fixed fold forming means such as 23 and 24, which may be readily replaced by small rolls or guide wheels such as are shown in FIGURE 7, which will conveniently form the folds in the bottom of the trough.

It is necessary and critical to the operation of the invention that the folds be placed in the lower portion of the web trough 21 adjacent to the vertical sides. As the foaming material swells, the upper portion thereof tends to adhere to the sides of the trough and raise them upwardly. Thus, the material forming the bottom portion of the folds will be drawn up to form the botom portion of the side panels. A single fold portion in the center generally is inadequate to provide for this expansion and occasionally will result in a pipe or void appearing in the lower section of the foamed slab. The exact size and dimension of the folds employed will depend on the particular foamable mixture used, the relative dimensions of the trough formed by the web 21 and the degree of expansion permitted by the conveyors and the web 29. Usually it is advantageous to employ a pair of folds having dimensions such that the total linear dimension of the bottom of the trough formed by web 21 is about three percent greater than the shortest distance between the sides of the trough.

In a typical operation, a polyurethane rigid foam formulation was employed with the method and apparatus of the invention. The web trough was 50 inches wide and 18 inches deep. Two folds were formed at the bottom of the trough, each fold having a generally rectangular configuration as illustrated in FIGURE 2 and being one and one half inches wide and three-eighths of an inch deep. The trough 21 moved at a rate of about 8 feet per minute and a foaming mixture comprising (a) 64 pounds per minute of mixture A; (b) 60 pounds per minute of mixture B was fed to the trough by a traverse head at a temperature of 28° C. The mixtures were prepared in the following manner.

PROCEDURE 1

Into a reaction vessel equipped with a means for stirring, temperature control, and maintaining a methane atmosphere were placed 17.1 parts of refined beet sugar, 11.5 parts of glycerol, 0.485 part of triethylamine catalyst, and .485 part of water. The mixture was preheated to 100° C., after which 45 parts of propylene oxide was added over a 12-hour time period. During this period, the pressure was maintained by the propylene oxide at from about 40 to about 50 p.s.i.g. and the temperature was maintained at about 100° C. Upon completion of the propylene oxide addition, the reaction mixture was digested for 2 hours at approximately 100° C. At the end of the digestion period, the pressure in the vessel was reduced to 5 mm. absolute, and maintained thereat for 15 minutes while maintaining the temperature at about 100° C. The product had a viscosity of 179.5 stokes at 210° F.

Viscosity=179.5 stokes at 210° F.
APHA Color=90

PROCEDURE 2

Preparation of Mixture A

Into a reaction vessel equipped with a means for heating, temperature control and maintaining a nitrogen atmosphere were placed 1723 parts of toluene diisocyanate (tolylene diisocyanate). The toluene diisocyanate was then preheated to 60° C., after which 450 parts of polyol, prepared as in Procedure 1, were added over a 90-minute period. During this period, the temperature of the reaction vessel was maintained between 60° and 80° C. The polyol semiprepolymer thus produced had a viscosity at 24° C. of 48 stokes and an NCO content of 28.5 percent.

PROCEDURE 3

Preparation of Mixture B

The following mixture was prepared:

91.0 grams of the polyol prepared in Procedure 1
0.6 gram of Silicone XL-520
0.7 gram of triethylenediamine
28.7 grams of trichlorofluoromethane.

After traveling a distance of 8 feet, the foamable mixture completely filled the trough. After traveling a total distance of 30 feet, the foamable material had solidified to a rigid foam. The continuously prepared slab was cut into lengths of approximately 8 feet and on removal of the paper webs was found to have a rectangular cross section which did not require slabbing before being cut into boards. By way of comparison, when the machine was operated in an identical manner, with the exception that the folds were not placed in the bottom of the paper trough, a rigid urethane slab was produced which had generally arcuate sides and rounded corners having a cross section of 52 inches by 18 inches and after trimming to a generally rectangular slab the cross section of the commercially acceptable slab was 48 inches by 16 inches having a cross sectional area of about 768 square inches. Operation in accordance with the invention on the same machine produced a slab having a cross section of 50 inches by 18, which was planed to 49 by 17 inches having a useable cross sectional area of 833 square inches which represents an increase in useful cross section of about 8½ percent. Therefore, it was readily seen that by practice of the present invention, larger commercially acceptable slabs are prepared on any given piece of foam producing equipment and the scrap is reduced from about 30 percent to about 10 percent, which represents a scrap reduction of about 20 percent and increase of about 8½ percent in useful cross sectional area of the slab.

In a similar manner, other foamable compositions may be processed into useful finished slabs of predetermined regular cross section by means of the method and apparatus of the present invention. Typically, such compositions are foamable urea formaldehyde resins, foamable phenol formaldehyde resins, polyvinyl chloride compositions and similar materials.

Various modifications may be made in the method of the present invention without departing from the spirit or scope thereof, and it is to be understood that we limit ourselves only as defined in the hereto appended claims.

What is claimed is:

1. In the production of foam slab employing a flexible and deformable web trough, said trough being deformable by an expandable foamable plastic material placed therein, said trough having two upwardly extending sides and a bottom, at least one of said sides having a generally planar configuration the sides and bottom of which are supported by individual conveyor means synchronized to forward the web; and a source of supply of foamable plastic material, the improvement which comprises: forming at the bottom of said web trough a pair of longitudinal folds generally adjacent to the upwardly extending portions of the web; adding a quantity of foam plastic producing material to said trough permitting said material to expand and open said folds and subsequently set to a rigid foam slab having a cross sectional configuration corresponding to a trough whose configuration is generally defined by the conveyor means which support the flexible and deformable web trough.

2. The method of claim 1, wherein a restraining force is applied about the entire periphery of said slab.

3. The method of claim 1, wherein said foam producing material is a polyurethane material.

4. The method of claim 3, wherein the excess web required to form said folds is about 3 percent of the distance between said upwardly extending sides.

5. A machine for the production of foam slab comprising a generally rectangular open top trough formed from a thin web, said trough having two generally vertically extending sides, said web being supported by at least three conveyor means, means for supplying a foamable liquid resin composition, the improvement of which comprises the addition of means to provide at least a pair of deformable longitudinal folds in the bottom of the web trough said folds being deformable by the foamable liquid resin composition, adjacent to the vertically extending sides, said deformable folds adapted to be removed by the expansion of the foamable liquid resin composition as the composition expands.

6. The apparatus of claim 5, wherein a foam restraining means is provided to confirm the cross sectional configuration of said slab.

7. The apparatus of claim 5, wherein said folds are generally downwardly extending.

8. The apparatus of claim 5, wherein said conveyor means are belt-positioned to give said trough a substantially rectangular cross section.

References Cited in the file of this patent

UNITED STATES PATENTS

| | | |
|---|---|---|
| 2,271,058 | Binns | Jan. 27, 1942 |
| 2,565,444 | Waters | Aug. 21, 1951 |
| 2,718,105 | Ferguson et al. | Sept. 20, 1955 |
| 2,753,277 | Smithers | July 3, 1956 |
| 2,891,288 | Daley | June 23, 1959 |
| 2,898,626 | Alderfer et al. | Aug. 11, 1959 |
| 2,910,730 | Risch | Nov. 3, 1959 |
| 3,034,942 | Heiks | May 15, 1962 |
| 3,091,811 | Hackert | June 4, 1963 |

FOREIGN PATENTS

| | | |
|---|---|---|
| 842,267 | Germany | Sept. 15, 1952 |
| 932,761 | Germany | Sept. 8, 1955 |

OTHER REFERENCES

British Plastics article, "New Polyester Foam Plant," vol. 34, No. 4, April 1961, p. 195, copies in Sci. Lib. and 18–48S.